United States Patent
Lin et al.

(10) Patent No.: US 8,885,363 B2
(45) Date of Patent: Nov. 11, 2014

(54) DUAL-MODE SWITCHING POWER CONTROL DEVICE

(71) Applicant: Inno-Tech Co., Ltd., Taipei (TW)

(72) Inventors: Ching-Yuan Lin, Taipei (TW); Shu-Chia Lin, Taipei (TW); Chih Feng Lin, Taipei (TW)

(73) Assignee: Inno-Tech Co., Ltd., Taipei (TW)

( * ) Notice: Subject to any disclaimer, the term of this patent is extended or adjusted under 35 U.S.C. 154(b) by 0 days.

(21) Appl. No.: 14/049,301

(22) Filed: Oct. 9, 2013

(65) Prior Publication Data

US 2014/0192563 A1 Jul. 10, 2014

(30) Foreign Application Priority Data

Jan. 8, 2013 (TW) ............................ 102100582 U

(51) Int. Cl.
*H02M 3/335* (2006.01)
*H02M 1/00* (2006.01)

(52) U.S. Cl.
CPC .. *H02M 3/33523* (2013.01); *H02M 2001/0032* (2013.01)
USPC ................... 363/21.12; 363/21.15; 363/21.18

(58) Field of Classification Search
USPC ............................................ 363/21.08–21.18
See application file for complete search history.

(56) References Cited

U.S. PATENT DOCUMENTS 5,999,433 A * 12/1999 Hua et al. ........................ 363/17
6,034,513 A * 3/2000 Farrington et al. ............ 323/285

* cited by examiner

*Primary Examiner* — Jue Zhang
(74) *Attorney, Agent, or Firm* — Lin & Associates IP, Inc.

(57) ABSTRACT

A dual-mode switching power control device includes an electric transformer, a PWM driving controller, a switching transistor, an isolation element, an output diode and an output capacitor. The PWM driving controller is connected to the switching transistor coupled to the electric transformer. The first side inductor of the electric transformer and the switching transistor are coupled to an input power, and the second side inductor of the electric transformer is coupled to the output diode. The output capacitor and a load are connected in series. The output power is converted into a feedback signal by the isolation element. The PWM driving controller determines to perform DCM or CCM based on the feedback signal to control the current flowing through the electric transformer, and the output power is generated. Therefore, the efficiency of power conversion is improved and is suitable for high power applications.

8 Claims, 5 Drawing Sheets

DUAL-MODE SWITCHING POWER CONTROL DEVICE

CROSS-REFERENCE TO RELATED APPLICATION

This application claims the priority of Taiwanese patent application No. 102100582, filed on Jan. 8, 2013, which is incorporated herewith by reference.

BACKGROUND OF THE INVENTION

1. Field of the Invention

The present invention relates to a control device for power conversion, and more specifically to a dual-mode switching power control device that dynamically controls a flyback converter to perform DCM (Discontinuous Conduction Mode) or CCM (Continuous Conduction Mode) based on a loading state.

2. The Prior Arts

Different electronic devices require specific electric power to operate. For example, ICs (integrated circuits) are supplied with 5V, 3V or 1.8V, electric motors need 12V DC, and high power devices require 110V or 220V AC, like city power. In particular, the lamp of the LED display usually operates at even much higher voltage. Thus, many kinds of electric converters have been developed to meet those various demands.

Flyback converters, which have advantages of simple architecture and wider range of adjustable voltage, are one of the most used switching power converters. As a result, flyback converters are often applied to electronic products consuming medium or small power. Specifically, flyback converters employ switching elements to control the current flowing through the electric transformer so as to generate the output power as desired. At the same time, passive resistor capacitor diodes (RCD) are used to reduce the voltage stress of the switching elements and effectively absorb voltage surge generated by the electric transformer due to leakage inductance.

In the prior arts, Quasi-Resonant (QR) technology is often utilized in flyback converters to reduce switching loss of the switching element by zero voltage and/or zero current switching process such that the efficiency of power conversion is increased. QR generally needs to operate in Discontinuous Conduction Mode (DCM) to drive the switching element so as to effectively reduce the inductance. Furthermore, EMI (electromagnetic interference) can be greatly suppressed by zero voltage and/or zero current switching, and valley switching. The stability of electric operation is thus improved. More specifically, in DCM, the switching element is driven and turned on when the first side current of the electric transformer reduces to zero. Alternatively, Continuous Conduction Mode (CCM) can be used to achieve the same function by turning on the switching element before the first side current of the electric transformer reduces to zero, that is, the first side current is continuous and never reduced to zero.

However, one shortcoming in the prior arts is that higher current spikes and RMS (root-mean-square) values are caused in QR flyback converters operating in DCM. It thus results in higher conduction loss and turn-off switching loss in heavy loading such that the efficiency of power conversion is reduced. Therefore, QR flyback converters operating in DCM are not suitable for higher power applications. Additionally, current power converters use various fixed preset modes or only one mode as the operating mode, and it is not possible to adjust or change the operating mode or operating parameters for different electric transformers and other elements such that the best efficiency is attained.

Therefore, it is greatly needed to provide dual-mode switching power control device, which is implemented by digital design and applicable from light to heavy loading, in particular can automatically determine the loading state and dynamically switch to DCM or CCM based on the loading state so as to improve the efficiency of power conversion, thereby overcoming the above problems in the prior arts.

SUMMARY OF THE INVENTION

The primary objective of the present invention is to provide dual-mode switching power control device for converting an input power with an input voltage into an output power with an output voltage supplied to an external load. The dual-mode switching power control device of the present invention generally includes an electric transformer, a PWM driving controller, a switching transistor, an isolation element, an output diode and an output capacitor. The electric transformer, the PWM driving controller, the switching transistor and the input power form a driving control loop, and the electric transformer, the output diode, the output capacitor and the isolation element form a feedback loop for generating a feedback signal which is transmitted to the PWM driving controller.

The PWM driving controller determines the loading state based on the feedback signal. Specifically, the PWM driving controller selects DCM to perform in case of light loading, and CCM is determined in case of heavy loading such that the switching transistor is driven to control the current flowing through the electric transformer, and the function of power conversion from the input power into output power is achieved.

Therefore, the present invention can reduce the switching loss by performing DCM in light loading, and reduce the conduction loss by performing CCM in heavy loading so as to greatly improve the efficiency of power conversion and is suitable for higher power applications.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
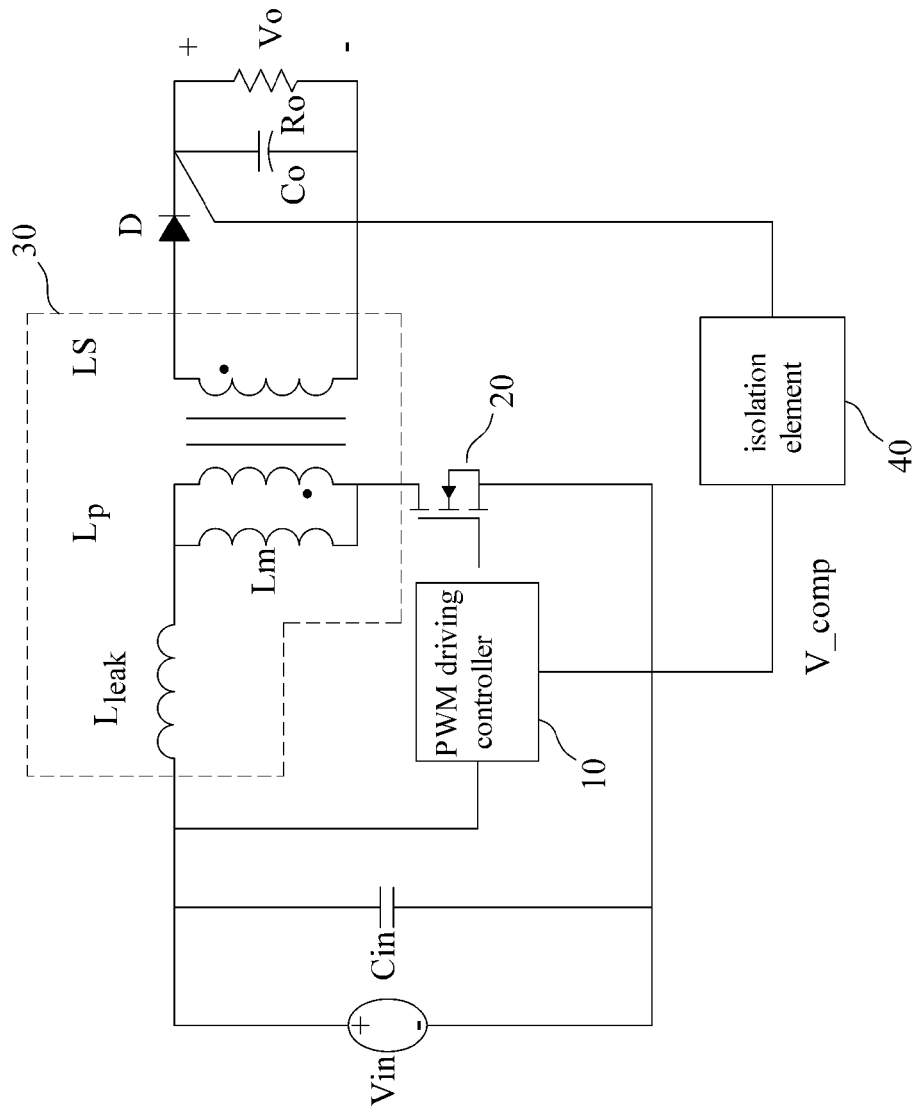
FIG. 1 is a schematic view illustrating the dual-mode switching power control device according to the present invention.

FIG. 1 illustrates a dual-mode switching power control device according to the present invention. As shown in FIG. 1, the dual-mode switching power control device of the present invention generally includes a PWM (pulse width modulation) driving controller 10, a switching transistor 20, an electric transformer 30, an isolation element 40, an output diode D and an output capacitor Co. The present invention implements the function of converting an input power with an input voltage Vin into an output power with an output voltage Vo for supplying to an external load Ro. More specifically, the electric transformer 30, the PWM driving controller 10, the switching transistor 20 and the input power with the input voltage Vin form a driving control loop. The electric transformer 30, the output diode D, the output capacitor Co and the isolation element 40 form a feedback loop for generating a feedback signal, like a feedback voltage V_comp shown in FIG. 1. Additionally, the external load Ro is connected to the output capacitor Co in parallel, and the terminal voltage of the output capacitor Co is the output voltage Vo of the output power.

It should be noted that any electrical signal other than the feedback voltage V_comp can also be specified as the above feedback signal, such as the feedback current or power corresponding to the output power. Moreover, the input power can be supplied with DC power, which is generated by rectifying common city power through an electric rectifying bridge. In other words, city power is 110V or 220V AC power, and the input power is 110V or 220V DC power. To remove high frequency noise, an input capacitor Cin is connected to the input power for stabilization.

The PWM driving controller 10 is a single chip, which is selected from a group consisting of MCU (microcontroller) or CPU (central processing unit), or an electric circuit consisting of discrete electric components. That is, the PWM driving controller 10 is implemented by digital design. The switching transistor 20 may include a power transistor, like a MOSFET (metal-oxide-semiconductor field effect transistor), and the isolation element 40 may include a photo coupler or an electric circuit consisting of at least one passive element, such as a resistor and a capacitor.

Hereinafter, the feedback voltage V_comp is served as the feedback signal to describe the architecture and primary aspects of the dual-mode switching power control device according to the present invention.

As shown in FIG. 1, the electric transformer 30 includes a first side inductor Lp and a second side inductor Ls. The first side inductor Lp consists of a magnetizing inductor Lm and a leakage inductor Lleak connected in series. The magnetizing inductor Lm is used to couple the magnetic flux generated with the second side inductor Ls, and the leakage inductor Lleak is not coupled with the second side inductor Ls.

One end of the first side inductor Lp is connected to the drain of the switching transistor 20, the PWM driving controller 10 is connected to the gate of the drain of the switching transistor 20, and the input voltage Vin of the input power is connected to the source of the switching transistor 20 and another end of the first side inductor Lp which is further connected to the PWM driving controller 10. One end of the second side inductor Ls is connected to the positive end of the output diode D, and the negative end of the output diode D is connected to one end of the output capacitor Co and one end of the isolation element 40. The isolation element 40 converts the output voltage Vo into the feedback signal, that is, the feedback voltage V_comp, which is then transmitted to the PWM driving controller 10 via another end of the isolation element 40.

Based on the feedback signal from the isolation element 40, the PWM driving controller 10 determines whether the current loading state of the load Ro is light loading or heavy loading. Specifically, the loading state is light loading when the feedback signal is smaller than a threshold value, and the loading state is heavy loading when the feedback signal is larger than the threshold value.

At the same time, in case of light loading, the PWM driving controller 10 performs DCM to generate the PWM driving signal, which is transmitted to the gate of the switching transistor 20 to drive the switching transistor 20. Similarly, when the loading state is heavy loading, CCM is performed to drive the switching transistor 20. Therefore, the present invention can dynamically select DCM or CCM according to the load state. Furthermore, in order to reduce EMI (electromagnetic interference), it is possible to include jitter design under CCM or DCM.

Figure 2:
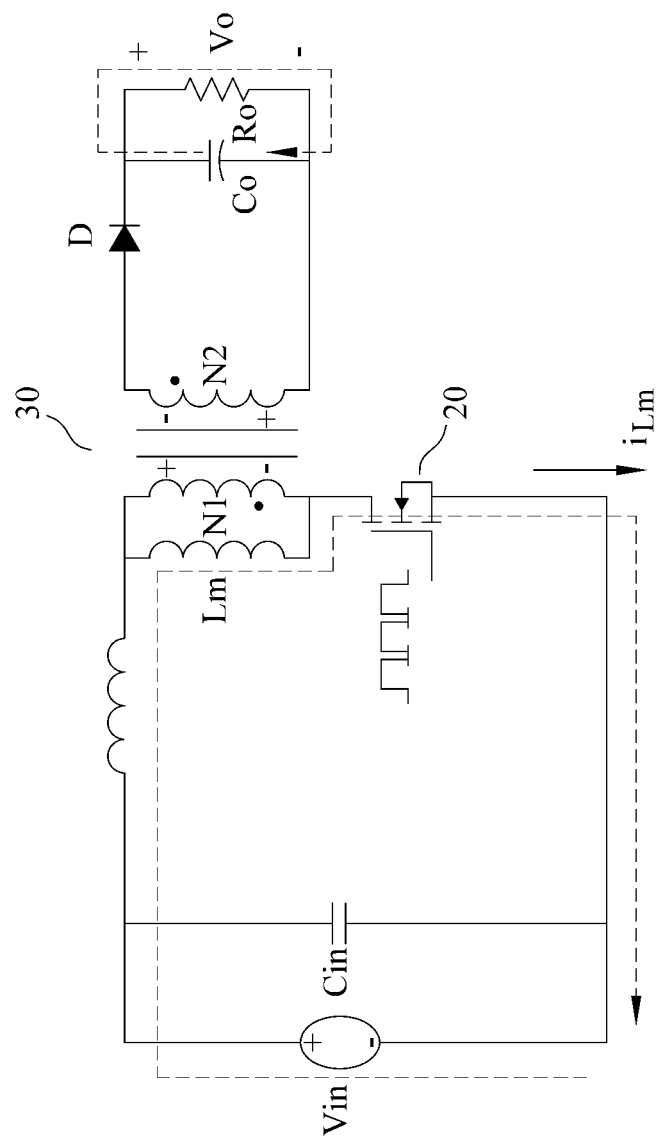
FIG. 2 is a view showing the turn-on operation for the switching element of the dual-mode switching power control device according to the one embodiment of the present invention.
Figure 3:
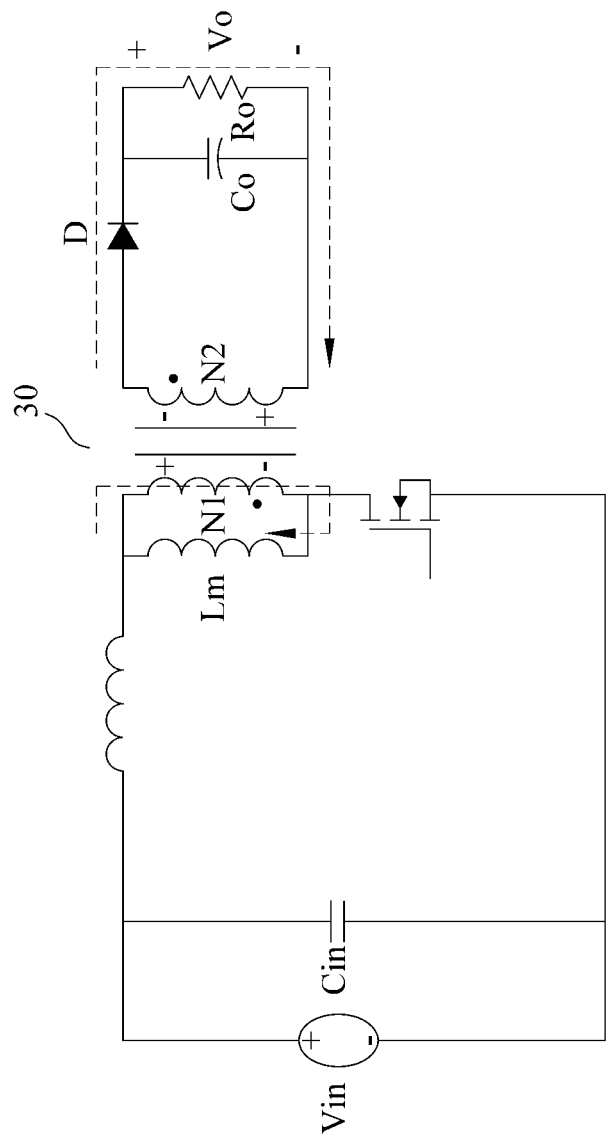
FIG. 3 is a view showing the turn-off operation for the switching element of the dual-mode switching power control device according to the present invention.

Referring to FIGS. 2 and 3, wherein, FIG. 2 is a view showing the turn-on operation for the switching element of the dual-mode switching power control device according to the present invention; and FIG. 3 is a view showing the turn-off operation for the switching element of the dual-mode switching power control device according to the present invention. The PWM driving controller 10 is not shown for clear explanation.

As shown in FIG. 2, the PWM driving signal generated by the PWM driving controller 10 is used to drive the switching element 20 such that the switching element 20 is turned on to allow the current from the input power to flow through the first side inductor Lp of the electric transformer 30 and the switching element 20, which form a current loop. At the same time, a negative voltage is induced at the second side inductor Ls of the electric transformer 30 to turn off the output diode D such that the output capacitor Co discharges to the load Ro, that is, the load Ro is supplied by the output capacitor Co.

As shown in FIG. 3, the PWM driving controller 10 ceases the PWM driving signal to turn off the switching element 20 such that some residual current still flows through the first side inductor Lp and a positive voltage corresponding to the residual current in the first side inductor Lp is induced by the second side inductor Ls to turn on the output diode D. The second side inductor Ls thus supplies the desired power to the load Ro.

Figure 4:
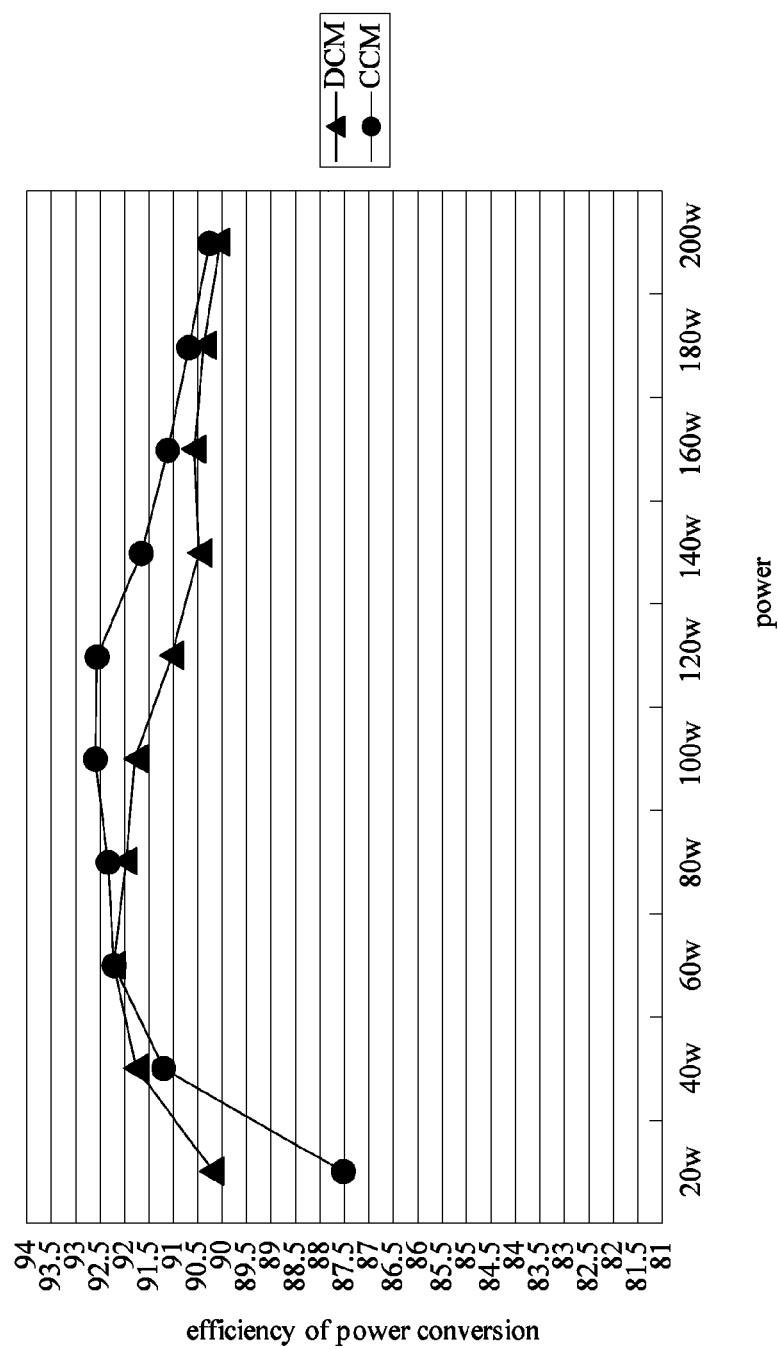
FIG. 4 is a diagram illustrating the conversion efficiency of the dual-mode switching power control device with the input power of 110V according to the present invention.
Figure 5:
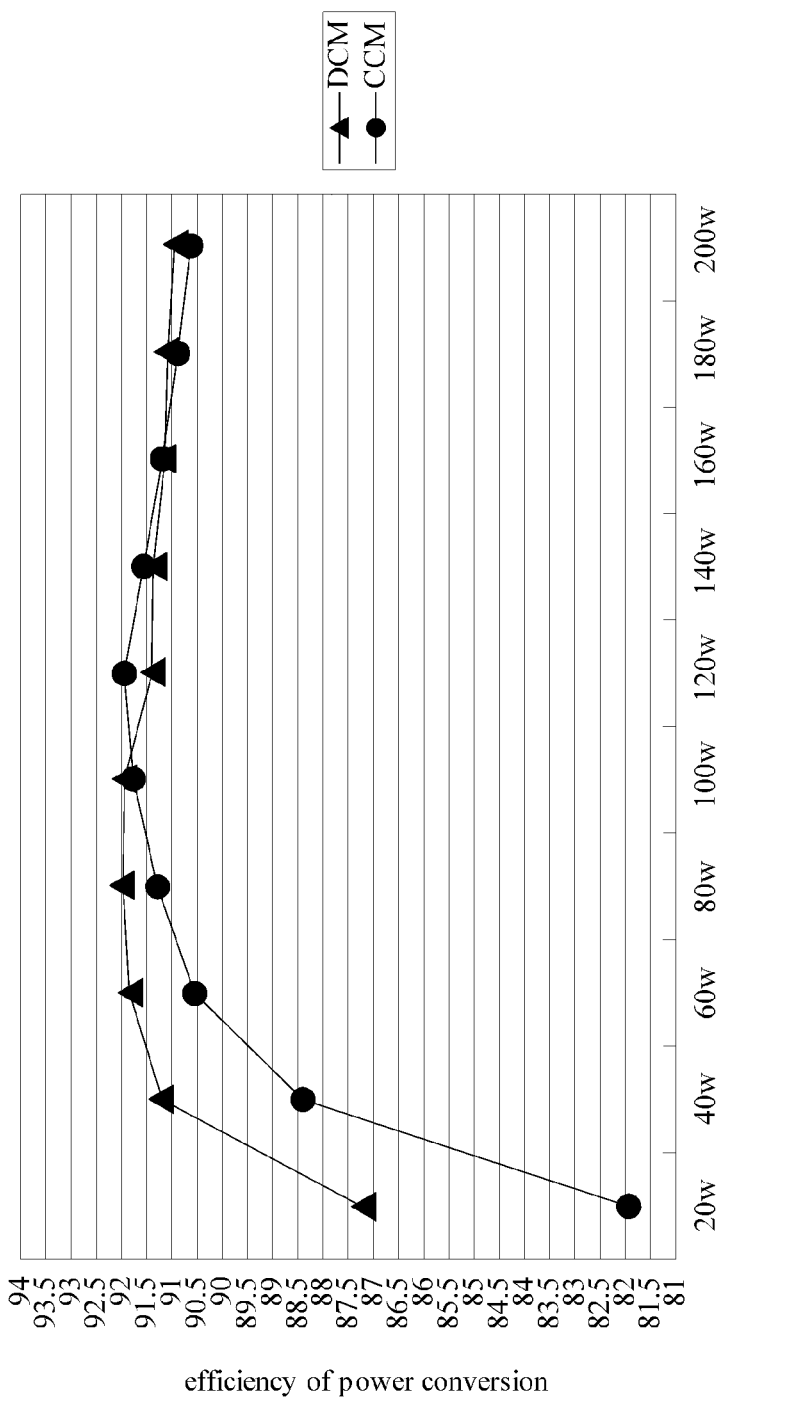
FIG. 5 is a diagram illustrating the conversion efficiency of the dual-mode switching power control device with the input power of 220V according to the present invention.

Specifically, the threshold value in the dual-mode switching power control device of the present invention is specified according to the efficiency of power conversion and can be optimized by measuring in experiments. For example, as shown in FIGS. 4 and 5, the data are measured in experiments for the input power of 100~120V and 210~230V, respectively. In terms of the output power and the efficiency of power conversion, the PWM driving controller first scan the whole system to acquire the characteristic CCM and DCM curves, and it is clearly seen that DCM has higher efficiency when the output power is lower, and CCM has higher efficiency when the output power is higher. Under such circumstances, the switching points for DCM or CCM are specified by the loading power or the output power of 50 W~70 W and 90 W~110 W for the input power of 100~120V and 210~230V, respectively. For instance, the feedback voltage V_comp serves as the feedback signal and is derived from the following equation:

$$V\_comp=Vo*K$$

where K is a ratio constant, like 1/20 or 1/50. Certainly, the above-mentioned operations are only illustrative examples for showing the primary aspects of the present invention and not intended to limit the scope of the present invention. Thus, the present invention may also include other nonlinear forms to correlate the feedback signal with the loading power, such as polynomial, semi-logarithmic, exponential function, and trigonometric functions, or the lookup table derived from experimental data and stored in the PWM driving controller 10.

From the above description, one feature of the present invention is that the feedback signal is used to determine the loading state such that DCM is performed when the output power is lower to reduce the switching loss, and CCM is performed when the output power is higher to reduce the conduction loss. As a result, the efficiency of power conversion is greatly improved and it is possible to apply to higher power electric or electronic devices.

In particular, the dual-mode switching power control device according to the present invention is implemented by digital design and can thus automatically determine the current loading state and select CCM or DCM as the operating mode to perform. At the same time, it is possible to adjust or change the operating mode or related operating parameters based on the electric transformer and other elements used, like operating frequency, duty, switching point for operation mode, dead-time, PWM output mode, soft start period, run/stop, over-current protection, shutdown, over-voltage protection (OVP), and so on.

Another feature of the present invention is that the system can always operate in only one operating mode, which is selected from CCM and DCM, by setting different parameters for switching frequency and duty. In other words, the various curves of conversion efficiency are first scanned, like FIGS. 4 and 5, and the optimal curve with the best efficiency is then selected. Because the PWM driving controller is implemented by digital design, even at the same loading, it is possible to calculate the output power and adjust the optimal parameters to perform the best efficiency according to the set frequency and duty. For example, the system with the output power of 18 W can respectively preset different frequency, duty, CCM/DCM at any loading between zero loading and full loading, such as zero loading (0 W), ¼ loading (4.5 W), ½ loading (9 W), ¾ loading (13.5 W) or full loading (18 W). Then the input power and the output power are calculated through digital processes for different settings so as to set the parameters with best efficiency. Particularly, the PWM driving controller may scan and measure the efficiency curve of power conversion corresponding to CCM/DCM selected, and select CCM or DCM with best efficiency as the target operating mode.

Moreover, it is preferred that the PWM driving controller 10 calculates the output power for the loading resulted from the external load Ro and then adjusts the optimal parameters to perform the best efficiency according to the set frequency and duty.

Although the present invention has been described with reference to the preferred embodiments, it will be understood that the invention is not limited to the details described thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dual-mode switching power control device for converting an input power with an input voltage into an output power with an output voltage supplied to an external load, comprising:

an electric transformer having a first side inductor and a second side inductor, the first side inductor having a first end connected to a positive end of the input power;

a PWM (pulse width modulation) driving controller being a single chip device selected from a group consisting of a MCU (microcontroller) and a CPU (central processing unit);

a switching transistor having a gate driven by a first terminal of the PWM driving controller, a drain connected to a second end of the first side inductor and a source connected to a negative end of the input power;

an isolation element having a first terminal connected to the output voltage for converting the output voltage into a feedback signal transmitted through a second terminal of the isolation element to a second terminal of the PWM driving controller, the feedback signal being correlated with loading power of the external load through a lookup table stored in the PWM driving controller;

an output diode having a positive end connected to a first end of the second side inductor and a negative end connected to the first terminal of the isolation element; and an output capacitor connected in parallel with the external load and having a first end connected to the negative end of the output diode and a second end connected to a second end of the second side inductor;

wherein the PWM driving controller determines whether a loading state of the external load is light loading or heavy loading based on the feedback signal, the loading state is light loading if the feedback signal is smaller than a threshold value, and the loading state is heavy loading if the feedback signal is larger than the threshold value, and the PWM driving controller performs DCM (Discontinuous Conduction Mode) to drive the gate of the switching transistor in case of the light loading, and performs CCM (Continuous Conduction Mode) in case of the light loading.

2. The dual-mode switching power control device as claimed in claim 1, further comprising an input capacitor connected to the input power.

3. The dual-mode switching power control device as claimed in claim 1, wherein the input power is a direct current (DC) power generated by rectifying city power through an electric bridge, the city power is an alternating current (AC) power of 110V or 220V, and the input voltage is 110V or 220V.

4. The dual-mode switching power control device as claimed in claim 1, wherein the switching transistor comprises an MOSFET (metal-oxide-semiconductor field effect transistor), the isolation element comprises a photo coupler or an electric circuit having at least one passive element, and the passive element includes a resistor and a capacitor.

5. The dual-mode switching power control device as claimed in claim 1, wherein the feedback signal has a linear or nonlinear relation with the output voltage.

6. The dual-mode switching power control device as claimed in claim 1, wherein the PWM driving controller specifies different frequencies, duties and DCM/CCM for any loading between zero loading and full loading, and calculates corresponding input power and output power so as to set parameters for the best efficiency.

7. The dual-mode switching power control device as claimed in claim 1, wherein the PWM driving controller scans, tests and acquires corresponding conversion efficiency curves at DCM and CCM, and selects one of DCM and CCM, which has higher conversion efficiency, as an operating mode based on the conversion efficiency curves.

8. The dual-mode switching power control device as claimed in claim 1, wherein the PWM driving controller calculates the output power for a loading resulted from the external load and adjusts the optimal parameters to perform the best efficiency according to the set frequency and duty.

* * * * *